US012699666B2

(12) United States Patent
     Khlat et al.

(10) Patent No.: US 12,699,666 B2
(45) Date of Patent: Aug. 4, 2026

(54) HYBRID BUS COMMUNICATION CIRCUIT

(71) Applicant: Qorvo US, Inc., Greensboro, NC (US)

(72) Inventors: Nadim Khlat, Cugnaux (FR);
               Christopher Truong Ngo, Queen
               Creek, AZ (US); **Alexander Wayne
               Hietala**, Phoenix, AZ (US)

(73) Assignee: Qorvo US, Inc., Greensboro, NC (US)

( * ) Notice: Subject to any disclaimer, the term of this
             patent is extended or adjusted under 35
             U.S.C. 154(b) by 0 days.

(21) Appl. No.: 18/044,257

(22) PCT Filed: Aug. 27, 2021

(86) PCT No.: PCT/US2021/047854
     § 371 (c)(1),
     (2) Date: Mar. 7, 2023

(87) PCT Pub. No.: WO2022/081263
     PCT Pub. Date: Apr. 21, 2022

(65) Prior Publication Data
     US 2023/0315662 A1     Oct. 5, 2023

Related U.S. Application Data

(60) Provisional application No. 63/091,111, filed on Oct.
     13, 2020.

(51) Int. Cl.
     *G06F 13/362*      (2006.01)
     *G06F 13/42*       (2006.01)
     *H04L 12/40*       (2006.01)
(52) U.S. Cl.
     CPC ........ *G06F 13/362* (2013.01); *G06F 13/4282*
               (2013.01); *H04L 12/40195* (2013.01)
(58) Field of Classification Search
     None
     See application file for complete search history.

(56) References Cited

U.S. PATENT DOCUMENTS

| | | | |
|---|---|---|---|
| 3,555,196 A | 1/1971 | Singer | |
| 3,953,835 A | 4/1976 | Cuccio et al. | |
| (Continued) | | | |

FOREIGN PATENT DOCUMENTS

| | | | |
|---|---|---|---|
| CN | 101501607 A | 8/2009 | |
| CN | 102591834 A | 7/2012 | |
| (Continued) | | | |

OTHER PUBLICATIONS

First Office Action for Chinese Patent Application No. 202080020865.
8, mailed Jan. 12, 2024, 12 pages.

(Continued)

*Primary Examiner* — Christopher A Bartels
(74) *Attorney, Agent, or Firm* — Withrow & Terranova,
P.L.L.C.

(57) ABSTRACT

A hybrid bus communication circuit is provided. The hybrid
bus communication circuit includes at least two different
types of communication buses. The hybrid bus communi-
cation circuit also includes a hybrid bridge circuit and
several multi-bus slave circuits each coupled to the two
different types of communication buses. In a non-limiting
example, each of the multi-bus slave circuits may commu-
nicate timing critical information via a first type communi-
cation bus and non-timing critical information via a second
type communication bus. The hybrid bridge circuit is con-
figured to receive a configuration command via the first type
communication bus and, accordingly, configure a configu-
ration parameter(s) in any of the multi-bus slave circuits via
the second type communication bus. As such, it is possible
to make time constrained configuration changes in any of the
multi-bus slave circuits without interfering with the timing
critical communication conducted via the first type commu-
nication bus.

19 Claims, 7 Drawing Sheets

(56)　　　　　References Cited

U.S. PATENT DOCUMENTS

| | | | |
|---|---|---|---|
| 4,336,447 | A | 6/1982 | Oguchi et al. |
| 4,424,812 | A | 1/1984 | Lesnick |
| 4,497,068 | A | 1/1985 | Fischer |
| 4,736,367 | A | 4/1988 | Wroblewski et al. |
| 5,412,644 | A | 5/1995 | Herberle |
| 5,459,660 | A | 10/1995 | Berra |
| 5,495,469 | A | 2/1996 | Halter et al. |
| 5,499,247 | A | 3/1996 | Matsuda et al. |
| 5,586,266 | A | 12/1996 | Hershey et al. |
| 5,621,897 | A | 4/1997 | Boury et al. |
| 5,684,803 | A | 11/1997 | Nguyen Thuy |
| 5,734,847 | A | 3/1998 | Garbus et al. |
| 5,748,675 | A | 5/1998 | Hormel et al. |
| 5,774,680 | A | 6/1998 | Wanner et al. |
| 5,787,132 | A | 7/1998 | Kishigami et al. |
| 5,832,207 | A | 11/1998 | Little et al. |
| 5,978,860 | A | 11/1999 | Chan et al. |
| 6,094,699 | A | 7/2000 | Surugucchi et al. |
| 6,141,708 | A | 10/2000 | Tavallaei et al. |
| 6,189,063 | B1 | 2/2001 | Rekeita et al. |
| 6,292,705 | B1 | 9/2001 | Wang et al. |
| 6,308,255 | B1 | 10/2001 | Gorishek, IV et al. |
| 6,310,408 | B1 | 10/2001 | Hermann |
| 6,360,291 | B1 | 3/2002 | Tavallaei |
| 6,397,279 | B1 | 5/2002 | Jaramillo et al. |
| 6,408,163 | B1 | 6/2002 | Fik |
| 6,484,268 | B2 | 11/2002 | Tamura et al. |
| 6,985,990 | B2 | 1/2006 | Bronson et al. |
| 7,197,589 | B1 | 3/2007 | Deneroff et al. |
| 7,519,005 | B2 | 4/2009 | Hejdeman et al. |
| 7,574,637 | B2 | 8/2009 | Richhetti et al. |
| 7,606,955 | B1 | 10/2009 | Falik et al. |
| 7,685,320 | B1 | 3/2010 | Wishneusky |
| 7,729,427 | B2 | 6/2010 | Kwok |
| 8,509,318 | B2 | 8/2013 | Tailliet |
| 8,694,710 | B2 | 4/2014 | Bas et al. |
| 8,775,707 | B2 | 7/2014 | Poulsen |
| 9,152,598 | B2 | 10/2015 | Fosse et al. |
| 9,166,584 | B1 | 10/2015 | Kandala et al. |
| 9,252,900 | B2 | 2/2016 | Poulsen |
| 9,430,321 | B2 | 8/2016 | Slik |
| 9,491,713 | B2 | 11/2016 | Dykyy et al. |
| 9,519,612 | B2 | 12/2016 | Hietala et al. |
| 9,569,386 | B2 | 2/2017 | Du |
| 9,639,500 | B2 | 5/2017 | Bas et al. |
| 9,652,451 | B2 | 5/2017 | Elder |
| 9,690,725 | B2 | 6/2017 | Sengoku |
| 9,755,821 | B2 | 9/2017 | Jang et al. |
| 9,946,677 | B2 | 4/2018 | Hapke |
| 10,176,130 | B2 | 1/2019 | Ngo et al. |
| 10,185,683 | B2 | 1/2019 | Ngo et al. |
| 10,558,607 | B2 | 2/2020 | Ngo et al. |
| 10,599,601 | B1 | 3/2020 | Ngo et al. |
| 10,983,942 | B1 | 4/2021 | Ngo et al. |
| 11,113,220 | B2 | 9/2021 | Ngo et al. |
| 11,483,778 | B2 | 10/2022 | Walkowiak et al. |
| 2001/0050713 | A1 | 12/2001 | Kubo et al. |
| 2003/0031039 | A1 | 2/2003 | Towler et al. |
| 2004/0049619 | A1 | 3/2004 | Lin |
| 2004/0100400 | A1 | 5/2004 | Perelman et al. |
| 2004/0128594 | A1 | 7/2004 | Elmhurst et al. |
| 2004/0221067 | A1 | 11/2004 | Huang et al. |
| 2005/0012492 | A1 | 1/2005 | Mihalka |
| 2005/0185665 | A1 | 8/2005 | Uboldi |
| 2005/0259609 | A1 | 11/2005 | Hansquine et al. |
| 2005/0289268 | A1 | 12/2005 | Miller |
| 2006/0031618 | A1 | 2/2006 | Hansquine et al. |
| 2006/0050694 | A1 | 3/2006 | Bury et al. |
| 2006/0087307 | A1 | 4/2006 | De Winter |
| 2006/0152236 | A1 | 7/2006 | Kim |
| 2006/0236008 | A1 | 10/2006 | Asano et al. |
| 2007/0073449 | A1 | 3/2007 | Kraemer et al. |
| 2008/0217076 | A1 | 9/2008 | Kraemer et al. |
| 2009/0121825 | A1 | 5/2009 | Har |
| 2009/0248932 | A1 | 10/2009 | Taylor et al. |
| 2010/0017553 | A1 | 1/2010 | Laurencin et al. |
| 2010/0122103 | A1 | 5/2010 | Roohparvar et al. |
| 2010/0305723 | A1 | 12/2010 | Koyama |
| 2010/0306430 | A1 | 12/2010 | Takahashi |
| 2011/0016255 | A1 | 1/2011 | Hsi et al. |
| 2011/0035632 | A1 | 2/2011 | Hong et al. |
| 2011/0113171 | A1 | 5/2011 | Radhakrishnan et al. |
| 2011/0227622 | A1 | 9/2011 | Kang |
| 2012/0027104 | A1 | 2/2012 | Bas et al. |
| 2012/0030753 | A1 | 2/2012 | Bas et al. |
| 2012/0102248 | A1 | 4/2012 | Tailliet |
| 2012/0144078 | A1 | 6/2012 | Poulsen |
| 2012/0161802 | A1 | 6/2012 | Lebourg et al. |
| 2012/0226965 | A1 | 9/2012 | Hammerschmidt et al. |
| 2012/0303836 | A1 | 11/2012 | Ngo et al. |
| 2013/0049817 | A1 | 2/2013 | Di Vincenzo et al. |
| 2013/0054850 | A1 | 2/2013 | Co |
| 2013/0124763 | A1 | 5/2013 | Kessler |
| 2013/0128724 | A1 | 5/2013 | Farley et al. |
| 2013/0132624 | A1 | 5/2013 | Chen et al. |
| 2013/0166801 | A1 | 6/2013 | Chun et al. |
| 2013/0197920 | A1 | 8/2013 | Lesso et al. |
| 2013/0265884 | A1 | 10/2013 | Brombal et al. |
| 2013/0301689 | A1 | 11/2013 | Marchand et al. |
| 2014/0025999 | A1 | 1/2014 | Kessler |
| 2014/0112339 | A1 | 4/2014 | Safranek et al. |
| 2014/0281593 | A1 | 9/2014 | Hayes |
| 2014/0304442 | A1 | 10/2014 | Hietala et al. |
| 2014/0310436 | A1 | 10/2014 | Du |
| 2014/0376278 | A1 | 12/2014 | Fornage et al. |
| 2015/0056941 | A1 | 2/2015 | Lin et al. |
| 2015/0074306 | A1 | 3/2015 | Ayyagari et al. |
| 2015/0097726 | A1 | 4/2015 | Babitch et al. |
| 2015/0106541 | A1 | 4/2015 | Southcombe et al. |
| 2015/0127862 | A1 | 5/2015 | Fan et al. |
| 2015/0149673 | A1 | 5/2015 | Balkan et al. |
| 2015/0169482 | A1 | 6/2015 | Ngo et al. |
| 2015/0178233 | A1* | 6/2015 | Guthrie ................ G06F 13/362 |
| | | | 710/114 |
| 2015/0192974 | A1 | 7/2015 | Ngo et al. |
| 2015/0193297 | A1 | 7/2015 | Ngo et al. |
| 2015/0193298 | A1 | 7/2015 | Ngo et al. |
| 2015/0193321 | A1 | 7/2015 | Ngo et al. |
| 2015/0193373 | A1 | 7/2015 | Ngo et al. |
| 2015/0200006 | A1 | 7/2015 | Wang et al. |
| 2015/0372679 | A1 | 12/2015 | Kee et al. |
| 2016/0050513 | A1 | 2/2016 | Wang et al. |
| 2016/0124892 | A1 | 5/2016 | Amarilio et al. |
| 2016/0224488 | A1 | 8/2016 | Huang et al. |
| 2016/0224489 | A1 | 8/2016 | Mishra et al. |
| 2016/0274185 | A1 | 9/2016 | Nishikawa |
| 2017/0003344 | A1 | 1/2017 | Uekusa |
| 2017/0040986 | A1 | 2/2017 | Ma |
| 2017/0104607 | A1 | 4/2017 | Sengoku |
| 2017/0255250 | A1* | 9/2017 | Ngo .................... G06F 13/4282 |
| 2017/0255578 | A1 | 9/2017 | Ngo et al. |
| 2017/0255579 | A1 | 9/2017 | Ngo et al. |
| 2017/0277651 | A1 | 9/2017 | Ngo et al. |
| 2017/0286340 | A1 | 10/2017 | Ngo et al. |
| 2018/0032457 | A1 | 2/2018 | Mishra et al. |
| 2018/0074985 | A1* | 3/2018 | Mishra ............. H04L 12/40013 |
| 2018/0083625 | A1 | 3/2018 | Garg |
| 2018/0095119 | A1 | 4/2018 | Chillara et al. |
| 2018/0173659 | A1* | 6/2018 | DenBoer ............... G06F 13/124 |
| 2018/0217959 | A1 | 8/2018 | Ngo et al. |
| 2018/0225251 | A1* | 8/2018 | Sthoeger ............. G06F 13/4291 |
| 2018/0247876 | A1 | 8/2018 | Kim et al. |
| 2018/0357121 | A1* | 12/2018 | Graif ................... G06F 11/1004 |
| 2019/0020433 | A1* | 1/2019 | Pitigoi-Aron ....... H04W 56/001 |
| 2019/0025373 | A1 | 1/2019 | Bradford |
| 2019/0132013 | A1* | 5/2019 | Sharma ................. H04W 72/56 |
| 2019/0158085 | A1* | 5/2019 | Rizvi ............ H03K 19/018592 |
| 2019/0250876 | A1 | 8/2019 | Amarilio et al. |
| 2019/0357044 | A1* | 11/2019 | Park ................... G06F 13/4282 |
| 2020/0033396 | A1 | 1/2020 | Feucht et al. |
| 2020/0081859 | A1 | 3/2020 | Mishra et al. |
| 2020/0151131 | A1 | 5/2020 | Ngo et al. |
| 2020/0334185 | A1 | 10/2020 | Ngo et al. |
| 2020/0344094 | A1 | 10/2020 | Mishra et al. |

(56) References Cited

U.S. PATENT DOCUMENTS

| | | | | |
|---|---|---|---|---|
| 2020/0394046 | A1 | 12/2020 | Snelgrove et al. | |
| 2020/0404069 | A1* | 12/2020 | Li | H04L 67/59 |
| 2021/0034557 | A1* | 2/2021 | Lee | G06F 13/42 |
| 2021/0081340 | A1* | 3/2021 | Rodd | G06F 13/20 |
| 2021/0081348 | A1* | 3/2021 | Rodd | G06F 13/4291 |
| 2021/0382677 | A1 | 12/2021 | Amarilio et al. | |
| 2021/0409335 | A1* | 12/2021 | Zhu | H04L 47/24 |
| 2022/0132524 | A1* | 4/2022 | Mueck | H04W 72/1215 |
| 2022/0147474 | A1 | 5/2022 | Ngo et al. | |
| 2022/0166644 | A1 | 5/2022 | Ngo et al. | |
| 2022/0216708 | A1 | 7/2022 | Wee et al. | |
| 2022/0244309 | A1 | 8/2022 | Sirisha et al. | |
| 2022/0312196 | A1* | 9/2022 | Guo | H04L 9/14 |
| 2022/0350522 | A1 | 11/2022 | Mayer et al. | |
| 2023/0047577 | A1* | 2/2023 | Bolton | H04B 1/0458 |
| 2023/0176120 | A1 | 6/2023 | Hietala et al. | |
| 2023/0198801 | A1 | 6/2023 | Ngo et al. | |
| 2023/0229616 | A1 | 7/2023 | Ngo et al. | |
| 2023/0253997 | A1 | 8/2023 | Notari et al. | |
| 2023/0267085 | A1* | 8/2023 | Mishra | G06F 13/4282 710/110 |
| 2024/0007295 | A1* | 1/2024 | Miyamoto | H04L 9/0891 |
| 2024/0202151 | A1 | 6/2024 | Lee et al. | |
| 2024/0303343 | A1* | 9/2024 | Zeng | G06F 21/575 |

FOREIGN PATENT DOCUMENTS

| | | |
|---|---|---|
| CN | 103870415 A | 6/2014 |
| CN | 104350700 A | 2/2015 |
| CN | 104598415 A | 5/2015 |
| EP | 2466481 A1 | 6/2012 |
| KR | 100590631 B1 | 6/2006 |
| KR | 20150060652 A | 6/2015 |

OTHER PUBLICATIONS

Examination Report for European Patent Application No. 20703620.3, mailed Dec. 12, 2023, 5 pages.

Final Office Action for U.S. Appl. No. 17/545,113, mailed Feb. 6, 2024, 30 pages.

Non-Final Office Action for U.S. Appl. No. 17/545,113, mailed Aug. 25, 2023, 28 pages.

Final Office Action for U.S. Appl. No. 16/736,164, mailed Jan. 11, 2021, 10 pages.

International Search Report and Written Opinion for International Patent Application No. PCT/US2020/012702, mailed Apr. 7, 2020, 17 pages.

Non-Final Office Action for U.S. Appl. No. 16/599,384, mailed Aug. 24, 2020, 8 pages.

Final Office Action for U.S. Appl. No. 16/599,384, mailed Dec. 1, 2020, 9 pages.

Non-Final Office Action for U.S. Appl. No. 16/549,116, mailed Aug. 6, 2020, 9 pages.

Final Office Action for U.S. Appl. No. 16/549,116, mailed Jan. 13, 2021, 9 pages.

Non-Final Office Action for U.S. Appl. No. 16/710,457, mailed Aug. 28, 2020, 7 pages.

Author Unknown, "IEEE Standard for Reduced-Pin and Enhanced-Functionality Test Access Point and Boundary-Scan Architecture," IEEE Std 1149.7™-2009, Feb. 10, 2010, IEEE, 1037 pages.

Kawoosa, M.S. et al., "Towards Single Pin Scan for Extremely Low Pin Count Test," 2018 31st International Conference on VLSI Design and 2018 17th International Conference on Embedded Systems (VLSID), Jan. 6-10, 2018, Pune, India, IEEE, 6 pages.

Advisory Action for U.S. Appl. No. 16/736,164, mailed Mar. 19, 2021, 3 pages.

Notice of Allowance for U.S. Appl. No. 16/736,164, mailed Apr. 29, 2021, 8 pages.

Advisory Action for U.S. Appl. No. 16/549,116, mailed Mar. 24, 2021, 3 pages.

Non-Final Office Action and Examiner-Initiated Interview Summary for U.S. Appl. No. 16/549,116, mailed May 12, 2021, 10 pages.

Applicant-Initiated Interview Summary for U.S. Appl. No. 16/549,116, mailed Aug. 18, 2021, 2 pages.

Notice of Allowance and Examiner-Initiated Interview Summary for U.S. Appl. No. 16/549,116, mailed Sep. 14, 2021, 15 pages.

Non-Final Office Action for U.S. Appl. No. 17/095,204, mailed Oct. 14, 2021, 8 pages.

Notice of Allowance for U.S. Appl. No. 17/095,204, mailed Mar. 17, 2022, 7 pages.

Non-Final Office Action for U.S. Appl. No. 17/102,510, mailed Mar. 18, 2022, 12 pages.

International Search Report and Written Opinion for International Patent Application No. PCT/US2021/047854, mailed Dec. 13, 2021, 13 pages.

Notice of Allowance for U.S. Appl. No. 17/552,497, mailed Feb. 22, 2023, 8 pages.

Non-Final Office Action for U.S. Appl. No. 14/575,491, mailed May 26, 2017, 20 pages.

Non-Final Office Action for U.S. Appl. No. 14/659,379, mailed Apr. 7, 2017, 37 pages.

Author Unknown, "1-Wire," Wikipedia, last modified Jan. 16, 2015, accessed Feb. 12, 2015, http://en.wikipedia.org/wiki/1-Wire, 4 pages.

Author Unknown, "DS1822: Econo 1-Wire Digital Thermometer," Maxim Integrated, 2007, 21 pages.

Author Unknown, "Maxim 1-Wire® Tutorial," Maxim, online audiovisual presentation, 17 slides, No Date, accessed Feb. 12, 2015, http://www.maximintegrated.com/products/1-wire/flash/overview/ (38 images of slides).

Awtry, Dan, et al., "Design Guide v1.0," Springbok Digitronics, Aug. 19, 2004, 96 pages.

Non-Final Office Action for U.S. Appl. No. 14/575,491, mailed Nov. 30, 2017, 18 pages.

Non-Final Office Action for U.S. Appl. No. 14/659,292, mailed Sep. 29, 2017, 27 pages.

Final Office Action for U.S. Appl. No. 14/659,292, mailed Apr. 30, 2018, 24 pages.

Non-Final Office Action for U.S. Appl. No. 14/659,328, mailed Sep. 8, 2017, 51 pages.

Final Office Action for U.S. Appl. No. 14/659,328, mailed Mar. 20, 2018, 61 pages.

Notice of Allowance for U.S. Appl. No. 14/659,328, mailed Jul. 2, 2018, 8 pages.

Non-Final Office Action for U.S. Appl. No. 14/659,355, mailed Sep. 20, 2017, 32 pages.

Final Office Action for U.S. Appl. No. 14/659,355, mailed Apr. 17, 2018, 11 pages.

Advisory Action for U.S. Appl. No. 14/659,355, mailed Jul. 5, 2018, 3 pages.

Non-Final Office Action for U.S. Appl. No. 15/467,790, mailed Jun. 28, 2018, 14 pages.

Ex Parte Quayle Action for U.S. Appl. No. 15/365,315, mailed Jul. 26, 2018, 7 pages.

Final Office Action for U.S. Appl. No. 14/659,379, mailed Oct. 18, 2017, 44 pages.

Advisory Action for U.S. Appl. No. 14/659,379, mailed Feb. 26, 2018, 3 pages.

Notice of Allowance for U.S. Appl. No. 14/659,379, mailed Mar. 20, 2018, 10 pages.

Non-Final Office Action for U.S. Appl. No. 14/659,371, mailed Sep. 25, 2017, 23 pages.

Final Office Action for U.S. Appl. No. 14/659,371, mailed May 3, 2018, 21 pages.

Advisory Action for U.S. Appl. No. 14/659,371, mailed Aug. 1, 2018, 3 pages.

Non-Final Office Action for U.S. Appl. No. 14/659,292, mailed Dec. 21, 2018, 23 pages.

Final Office Action for U.S. Appl. No. 14/659,292, mailed Jun. 4, 2019, 24 pages.

Non-Final Office Action for U.S. Appl. No. 14/659,355, mailed Oct. 12, 2018, 8 pages.

(56)    References Cited

OTHER PUBLICATIONS

Final Office Action for U.S. Appl. No. 14/659,355, mailed May 2, 2019, 8 pages.
Non-Final Office Action for U.S. Appl. No. 15/886,209, mailed May 17, 2019, 7 pages.
Non-Final Office Action for U.S. Appl. No. 14/659,371, mailed Feb. 26, 2019, 22 pages.
Non-Final Office Action for U.S. Appl. No. 15/365,295, mailed Mar. 29, 2019, 15 pages.
Final Office Action for U.S. Appl. No. 15/365,295, mailed Aug. 15, 2019, 11 pages.
Final Office Action for U.S. Appl. No. 15/467,790, mailed Nov. 5, 2018, 15 pages.
Advisory Action for U.S. Appl. No. 15/467,790, mailed Feb. 26, 2019, 3 pages.
Notice of Allowance for U.S. Appl. No. 15/467,790, mailed May 20, 2019, 8 pages.
Non-Final Office Action for U.S. Appl. No. 15/443,236, mailed Nov. 16, 2018, 19 pages.
Final Office Action for U.S. Appl. No. 15/443,236, mailed May 30, 2019, 20 pages.
Notice of Allowance and Examiner-Initiated Interview Summary for U.S. Appl. No. 15/365,315, mailed Sep. 14, 2018, 9 pages.
Notice of Allowance for U.S. Appl. No. 15/472,756, mailed Aug. 8, 2018, 8 pages.
Notice of Allowance for U.S. Appl. No. 15/886,209, mailed Sep. 11, 2019, 7 pages.
Notice of Allowance for U.S. Appl. No. 16/402,613, mailed Nov. 4, 2019, 9 pages.
Notice of Allowance for U.S. Appl. No. 16/407,397, mailed Nov. 12, 2019, 7 pages.
Advisory Action for U.S. Appl. No. 15/365,295, mailed Nov. 6, 2019, 3 pages.
Corrected Notice of Allowance for U.S. Appl. No. 15/467,790, mailed Aug. 15, 2019, 6 pages.
Corrected Notice of Allowance for U.S. Appl. No. 15/467,790, mailed Aug. 28, 2019, 6 pages.
Notice of Allowance for U.S. Appl. No. 15/443,236, mailed Sep. 24, 2019, 8 pages.
Notice of Allowance for U.S. Appl. No. 15/365,295, mailed Feb. 25, 2020, 8 pages.
Awtry, Dan, "Transmitting Data and Power over a One-Wire Bus," Sensors, Feb. 1997, Dallas Semiconductor, 4 pages.
Non-Final Office Action for U.S. Appl. No. 16/736,164, mailed Feb. 27, 2020, 7 pages.
Final Office Action for U.S. Appl. No. 16/736,164, mailed Jun. 2, 2020, 7 pages.
Non-Final Office Action for U.S. Appl. No. 16/736,164, mailed Sep. 21, 2020, 8 pages.
Extended European Search Report for European Patent Application No. 22208632.4, mailed May 2, 2023, 11 pages.
Extended European Search Report for European Patent Application No. 22210008.3, mailed Apr. 25, 2023, 7 pages.
Extended European Search Report for European Patent Application No. 23152712.8, mailed Apr. 24, 2023, 11 pages.
Advisory Action for U.S. Appl. No. 17/545,113, mailed Apr. 3, 2024, 3 pages.
Notice of Allowance for U.S. Appl. No. 17/545,113, mailed May 1, 2024, 9 pages.
Non-Final Office Action for U.S. Appl. No. 18/154,127, mailed Apr. 15, 2024, 21 pages.
Notice of Allowance for U.S. Appl. No. 18/154,127, mailed Aug. 23, 2024, 8 pages.
Corrected Notice of Allowability for U.S. Appl. No. 18/154,127, mailed Oct. 7, 2024, 6 pages.
Mishra, Lalan, "A Snapshot on MIPI RFFE v3.0 from a Systems Architecture Perspective," MIPI Alliance Developers Conference, Sep. 22-23, 2020, 19 pages.

* cited by examiner

HYBRID BUS COMMUNICATION CIRCUIT

RELATED APPLICATIONS

This application is 35 USC 371 national phase filing of International Application No. PCT/US21/47854, filed Aug. 27, 2021, which claims the benefit of U.S. provisional patent application Ser. No. 63/091,111, filed on Oct. 13, 2020, the disclosures of which are incorporated herein by reference in their entireties.

FIELD OF THE DISCLOSURE

The technology of the disclosure relates generally to a hybrid bus communication circuit, and in particular a communication circuit having mixed types of communication buses.

BACKGROUND

Mobile communication devices have become increasingly common in current society. The prevalence of these mobile communication devices is driven in part by the many functions that are now enabled on such devices. Increased processing capabilities in such devices means that mobile communication devices have evolved from being pure communication tools into sophisticated mobile multimedia centers that enable enhanced user experiences.

The redefined user experience requires higher data rates offered by advanced wireless communication technologies, such as fifth-generation new-radio (5G-NR). Notably, a radio frequency (RF) signal(s) communicated via such advanced wireless communication systems can be modulated across a wide modulation bandwidth (e.g., from 80 KHz to over 200 MHz) and transmitted in a millimeter wave (mmWave) spectrum. As such, a wireless communication device typically employs a variety of digital and analog circuits, such as digital transceiver, power management integrated circuit (PMIC), power amplifier (PA), filter, switch, coupler, antenna tuner, and so on, to process the RF signal(s) to satisfy ever-stringent regulatory and performance requirements.

The various of digital and analog circuits can be configured to communicate with each other via a mixture of communication buses, such as a multi-wire serial bus, a single-wire serial bus, a single-wire peer-to-peer bus, and so on. These communication buses may each be designed and/or optimized for a particular type(s) of communication(s). As such, it is desirable to utilize an appropriate type of communication bus between a particular type(s) of digital and/or analog circuit(s) to help drive down complexity, cost, footprint, and/or power consumption in the wireless communication device.

SUMMARY

Aspects disclosed in the detailed description include a hybrid bus communication circuit. The hybrid bus communication circuit includes at least two different type of communication buses. The hybrid bus communication circuit also includes a hybrid bridge circuit and several multi-bus slave circuits each coupled to the two different types of communication buses. In a non-limiting example, each of the multi-bus slave circuits may communicate timing critical information via a first type communication bus and non-timing critical information via a second type communication bus. The hybrid bridge circuit is configured to receive a configuration command via the first type communication bus and, accordingly, configure a configuration parameter(s) in any of the multi-bus slave circuits via the second type communication bus. As such, it is possible to make time constrained configuration changes in any of the multi-bus slave circuits without interfering with the timing critical communication conducted via the first type communication bus.

In one aspect, a hybrid bus communication circuit is provided. The hybrid bus communication circuit includes a first type communication bus and a second type communication bus. The hybrid bus communication circuit also includes a number of multi-bus slave circuits each coupled to the first type communication bus and the second type communication bus. The hybrid bus communication circuit also includes a hybrid bridge circuit coupled to the first type communication bus and the second type communication bus. The hybrid bridge circuit is configured to receive a configuration command via the first type communication bus. The hybrid bridge circuit is also configured to determine one or more configuration parameters based on the received configuration command. The hybrid bridge circuit is also configured to configure the determined one or more configuration parameters in at least one selected multi-bus slave circuit among the multi-bus slave circuits via the second type communication bus.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure and, together with the description, serve to explain the principles of the disclosure.

DETAILED DESCRIPTION

Figure 1A:
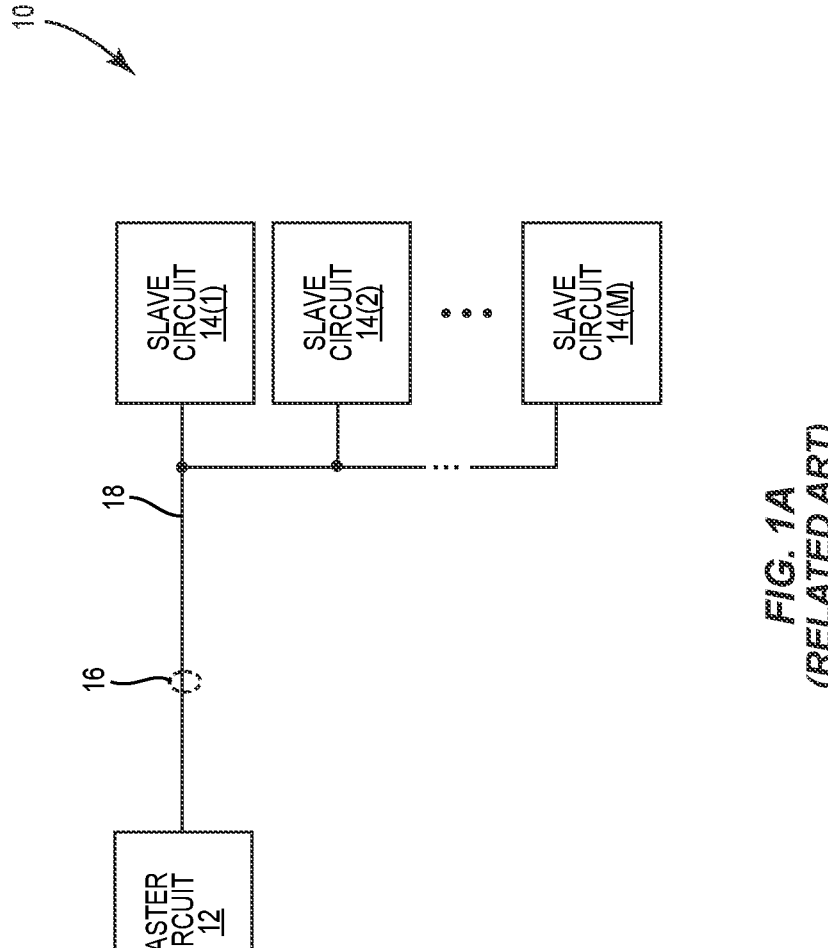
FIG. 1A is a schematic diagram of an exemplary existing single-bus communication circuit in which a master circuit is configured to communicate with a slave circuit(s) over a single-wire serial bus (SuBUS)

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Aspects disclosed in the detailed description include a hybrid bus communication circuit. The hybrid bus communication circuit includes at least two different types of communication buses. The hybrid bus communication circuit also includes a hybrid bridge circuit and several multi-bus slave circuits each coupled to the two different types of communication buses. In a non-limiting example, each of the multi-bus slave circuits may communicate timing critical information via a first type communication bus and non-timing critical information via a second type communication bus. The hybrid bridge circuit is configured to receive a configuration command via the first type communication bus and, accordingly, configure a configuration parameter(s) in any of the multi-bus slave circuits via the second type communication bus. As such, it is possible to make time constrained configuration changes in any of the multi-bus slave circuits without interfering with the timing critical communication conducted via the first type communication bus.

Figure 1B:
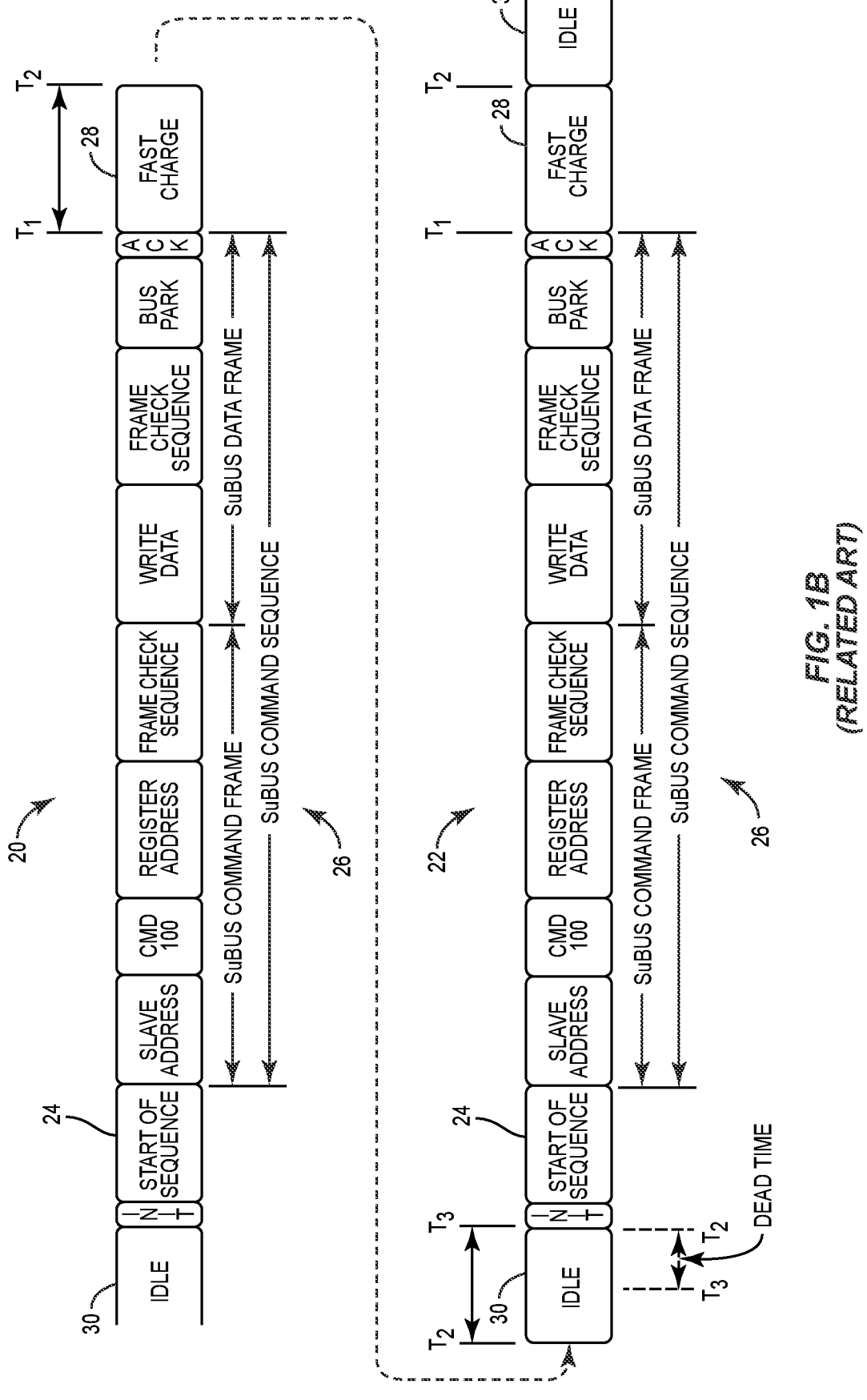
FIG. 1B is a schematic diagram providing an exemplary illustration of one or more SuBUS telegrams communicated over the SuBUS of FIG. 1A.
Figure 1C:
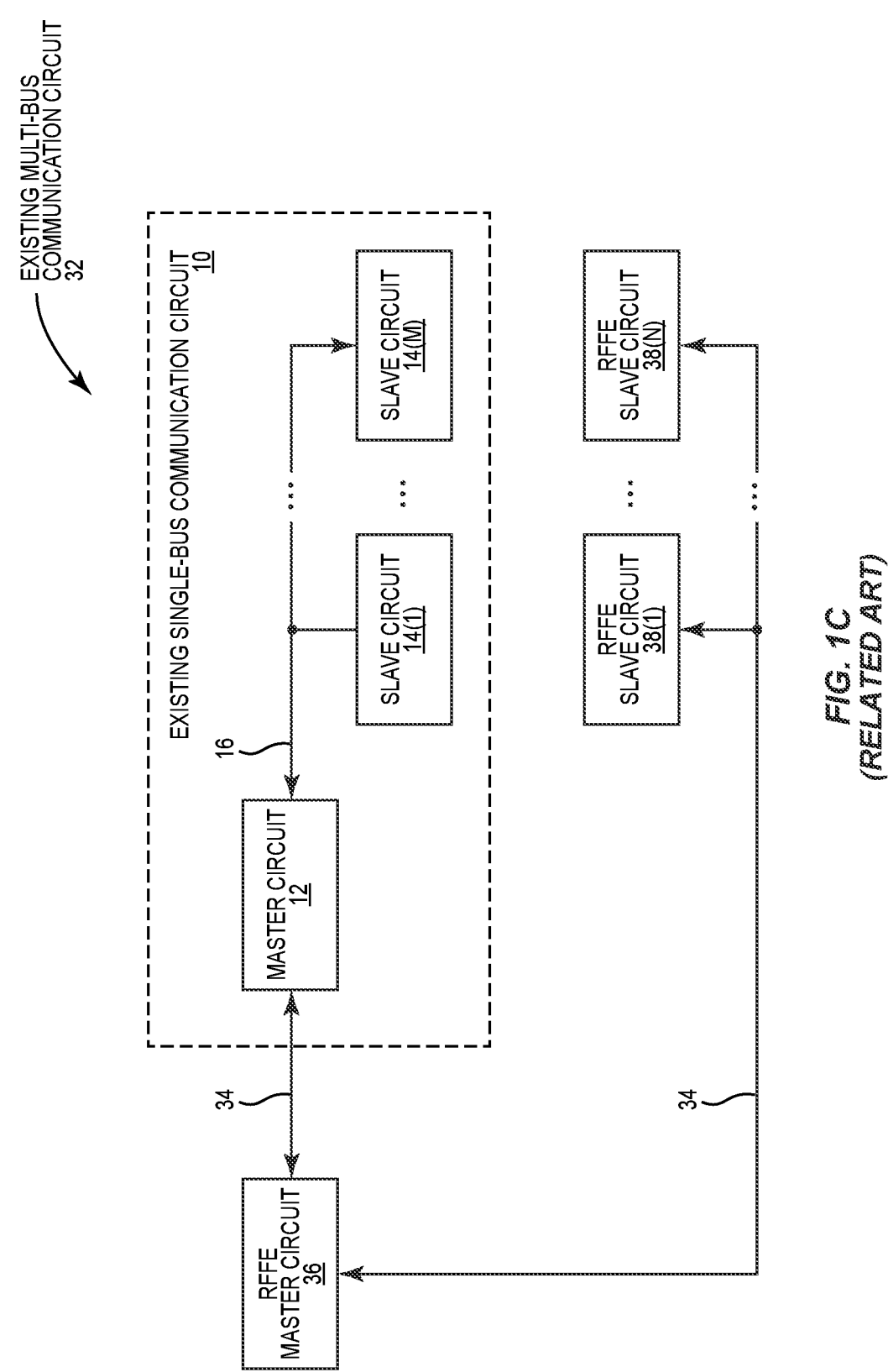
FIG. 1C is a schematic diagram of an exemplary existing multi-bus communication circuit including a multi-wire serial bus and the SuBUS in FIG. 1A.
Figure 2:
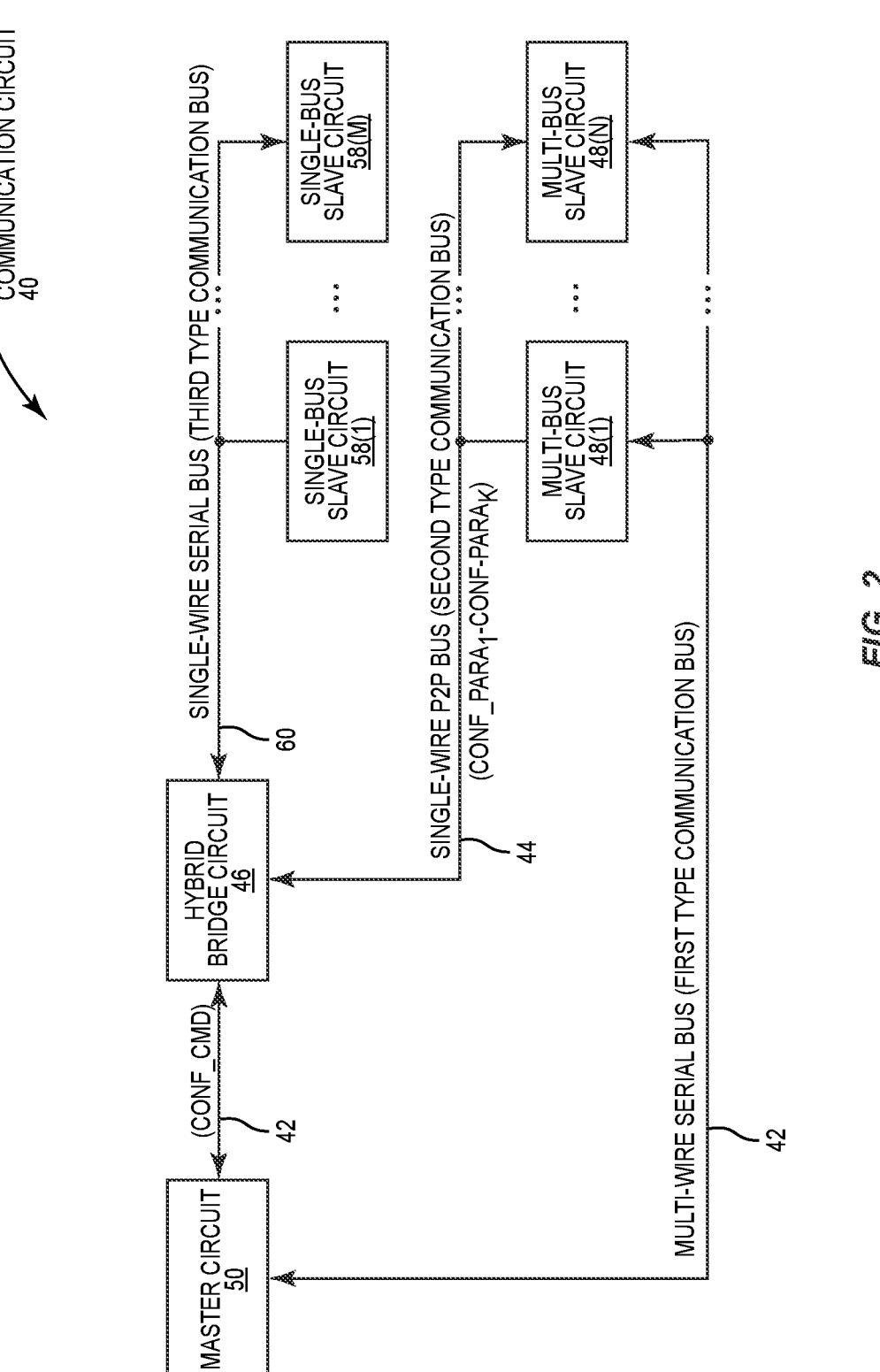
FIG. 2 is a schematic diagram of an exemplary hybrid bus communication circuit configured according to embodiments of the present disclosure to communicate time constrained configuration changes over a dedicated single-wire peer-to-peer bus.

Before discussing a hybrid bus communication circuit of the present disclosure, starting at FIG. 2, a brief overview of an existing single-wire serial bus (SuBUS) and an existing multi-bus communication circuit including a standard radio frequency (RF) front-end (RFFE) bus and the existing SuBUS is first provided with reference to FIGS. 1A-1C.

In this regard, FIG. 1A is a schematic diagram of an exemplary existing single-bus communication circuit 10 in which a master circuit 12 is configured to communicate with one or more slave circuits 14(1)-14(M) over a SuBUS 16 consisting of a single wire 18. The master circuit 12 is configured to always initiate a SuBUS telegram communication over the SuBUS 16 by communicating a SuBUS telegram(s). Herein, a communication bus is said to operate based on a master-slave architecture if communications over the communication bus can only be initiated by a master circuit.

The slave circuits 14(1)-14(M) may provide a data payload(s) to the master circuit 12 over the SuBUS 16 in response to receiving the SuBUS telegram(s) from the master circuit 12. Hereinafter, when the master circuit 12 and the slave circuits 14(1)-14(M) are communicating the SuBUS telegram(s) and/or the data payload(s) over the SuBUS 16, the master circuit 12 and the slave circuits 14(1)-14(M) are said to be in a bus communication mode.

FIG. 1B is a schematic diagram providing an exemplary illustration of one or more SuBUS telegrams 20, 22 communicated over the SuBUS 16 of FIG. 1A. Each of the SuBUS telegrams 20, 22 includes a start of sequence (SOS) sequence 24 and a SuBUS command sequence 26. The SuBUS command sequence 26 may correspond to a predefined SuBUS operation (e.g., register-read or register-write). The SOS sequence 24 always precedes the SuBUS command sequence 26 and is always communicated from the master circuit 12 to the slave circuits 14(1)-14(M) in FIG. 1A.

The SuBUS telegram 22, which succeeds the SuBUS telegram 20, may be separated from the SuBUS telegram 20 by a fast-charge period 28 that starts at time $T_1$ and ends at time $T_2$ $(T_2>T_1)$ and an idle period 30 that starts at time $T_2$ and ends at time $T_3$ $(T_3>T_2)$. The fast-charge period 28 is configured to allow each of the slave circuits 14(1)-14(M) to draw a higher charging current via the SuBUS 16 and carry out a defined slave operation. In this regard, the SuBUS 16 is said to be in a fast-charge state during the fast-charge period 28. The idle period 30 may be a no-activity period in which the master circuit 12 and the slave circuits 14(1)-14(M) may be inactive to help conserve power. Accordingly, the SuBUS 16 is said to be in an idle state during the idle period 30. During the fast-charge period 28 and the idle period 30, the SuBUS 16 is maintained at a bus voltage $V_{BUS}$ that is greater than zero volts ($V_{BUS}$>0 V).

The master circuit 12 is configured to suspend the SuBUS telegram communication over the SuBUS 16 during the fast-charge period 28 and the idle period 30. Accordingly, the master circuit 12 and the slave circuits 14(1)-14(M) are configured to refrain from communicating SuBUS telegram (s) and data payload(s) from time $T_1$ to $T_3$. In this regard, the SuBUS 16 can be said to be in a suspension mode between time $T_1$ and $T_3$.

In the existing single-bus communication circuit 10, the SuBUS telegram communication over the SuBUS 16 can only be initiated by the master circuit 12. As such, none of the slave circuits 14(1)-14(M) may initiate the SuBUS telegram communication with the master circuit 12, unless being Polled by the master circuit 12. For example, if any of the slave circuits 14(1)-14(M) has an urgent need to communicate the data payload(s) to the master circuit 12 at time $T_1$, the slave circuit would be forced to wait until at least time $T_3$ to have a chance to access the SuBUS 16, thus hindering the ability of the slave circuit 14(1)-14(M) to fulfill a time-constrained communication need(s).

The SuBUS 16 is typically used in a wireless communication device (e.g., smartphone) for enabling low data rate and/or non-timing critical communication between, for example, a transceiver circuit and an antenna tuner. Understandably, the wireless communication device can also include a variety of circuits, such as power management integrated circuit (PMIC), power amplifier (PA), low noise amplifier (LNA), switch, filter, coupler, power detector, and so on, that need to exchange timing critical information with the transceiver circuit. As such, the wireless communication device often needs to employ different types of communication buses to cater for different types of communications between different types of digital and/or analog circuits.

In this regard, FIG. 1C is a schematic diagram of an existing multi-bus communication circuit 32 that includes a multi-wire serial bus 34 and the SuBUS 16 in FIG. 1A. Common elements between FIGS. 1A and 1C are shown therein with common element numbers and will not be re-described herein.

In a non-limiting example, the multi-wire serial bus 34 is an RFFE bus as defined in in MIPI® alliance specification for radio frequency front-end control interface, version 2.1. In this regard, the existing multi-bus communication circuit 32 includes an RFFE master circuit 36 that communicates with multiple RFFE slave circuits 38(1)-38(N) via the multi-wire serial bus 34. Given that the RFFE master circuit 36 has total control over the multi-wire serial bus 34, the multi-wire serial bus 34 is said to operate based on a master-slave bus architecture.

The existing multi-bus communication circuit 32 further includes the existing single-bus communication circuit 10 of FIG. 1A. Herein, the master circuit 12 in the existing single-bus communication circuit 10 is coupled to the RFFE master circuit 36 via the multi-wire serial bus 34 and operates as a slave to the RFFE master circuit 36.

In a non-limiting example, the RFFE master circuit 36 can be a digital transceiver circuit, the slave circuits 14(1)-14(M) can be, for example, antenna tuners, and the RFFE slave circuits 38(1)-38(N) can be PMICs, PAs, LNAS, switches, filters, couplers, power detectors, and so on. In this regard, the master circuit 12 can bridge non-timing critical communications (e.g., static and/or sporadic configuration) between the RFFE master circuit 36 and the slave circuits 14(1)-14

(M). In contrast, the RFFE master circuit 36 will communicate timing critical information (e.g., information communicated on a per-symbol or per-frame basis) directly with the RFFE slave circuits 38(1)-38(N) over the multi-wire serial bus 34.

However, the RFFE master circuit 36 may need to dynamically change some configurations (e.g., frequency band, PA bias table, voltage lookup table, etc.) in the RFFE slave circuits 38(1)-38(N). Although the configuration changes may not be timing critical, these configuration changes may nevertheless be time constrained. Herein, a configuration change(s) is said to be time constrained when the configuration change(s) must be completed by a specific time. For example, the configuration changes may be initiated during one symbol or frame burst and must be completed by a start of a next symbol or frame burst.

One way of making such time constrained configuration changes may be to multiplex the time constrained configuration changes with the time critical information being carried on the multi-wire serial bus 34. However, doing so may overload the multi-wire serial bus 34 to potentially interfere or even interrupt communication of the time critical information. In addition, it may require firmware or even hardware changes at the RFFE master circuit 36 to support such multiplexing schemes, which can increase implementation complexity at the RFFE master circuit 36. As such, it is desirable to enable time constrained configuration changes with lower implementation complexity and without interference to the multi-wire serial bus 34.

Alternatively, it may be possible to add an additional RFFE bus dedicated for communicating the time constrained configuration changes from the RFFE master 36 to the RFFE slave circuits 38(1)-38(N). Unfortunately, such approach may not be practical for several reasons. First, although the configuration changes may be time constrained, it may not be necessary for such configuration changes to be made in real time. Second, such time constrained configuration changes may not require as high a data rate as the RFFE bus can provide. In addition, there may not be enough space for adding an additional RFFE bus in, for example, a smartphone where real estate is scarce. Hence, it is desirable to provide the additional communication channel between the RFFE master circuit 36 and the RFFE slave circuits 38(1)-38(N) without having to add the additional RFFE bus.

In this regard, FIG. 2 is a schematic diagram of an exemplary hybrid bus communication circuit 40 configured according to embodiments of the present disclosure. The hybrid bus communication circuit includes a first type communication bus 42 dedicated for communicating timing critical information and a second type communication bus 44 dedicated for communicating time constrained configuration changes. By dedicating the second type communication bus 44 for communicating the time constrained configuration changes, it is possible to avoid interference and/or interruption to the timing critical information carried over the first type communication bus 42.

In a non-limiting example, the first type communication bus 42 is an RFFE bus that includes multiple wires and operates based on a master-slave bus architecture. The second type communication bus 44, in contrast, is a single-wire peer-to-peer (P2P) bus that includes a single wire and operates based on a peer-to-peer bus architecture. Herein, a communication bus is said to operate based on a peer-to-peer bus architecture if communications over the communication bus can be initiated by any of the circuits connected to the communication bus.

In this regard, the second type communication bus 44 is a light weighted communication bus with smaller footprint and lesser implementation complexity compared to the first type communication bus 42. As such, the second type communication bus 44 may be a more practical and economical option than the first type communication bus 42 for communicating the time constrained configuration changes.

The hybrid bus communication circuit 40 includes a hybrid bridge circuit 46 and a number of multi-bus slave circuits 48(1)-48(N), each coupled to the first type communication bus 42 and the second type communication bus 44. In a non-limiting example, the multi-bus slave circuits 48(1)-48(N) can be PMICs, PAS, LNAs, switches, filters, couplers, power detectors, and so on. The hybrid bus communication circuit 40 further includes a master circuit 50, which can be a transceiver circuit, as an example. The master circuit 50 is coupled to the hybrid bridge circuit 46 and the multi-bus slave circuits 48(1)-48(M) via the first type communication bus 42. As such, the hybrid bridge circuit 46 and the multi-bus slave circuit 48(1)-48(N) are slave circuits to the master circuit 50. Accordingly, the master circuit 50 can communicate the timing critical information to the hybrid bridge circuit 46 and the multi-bus slave circuit 48(1)-48(N) via the first type communication bus 42.

The hybrid bridge circuit 46 is coupled to the multi-bus slave circuits 48(1)-48(N) via the second type communication bus 44. In an embodiment, the hybrid bridge circuit 46 is configured to receive a configuration command CONF_CMD via the first type communication bus 42 for making a configuration change in at least one selected multi-bus slave circuit (e.g., 48(1)) among the multi-bus slave circuits 48(1)-48(N). Accordingly, the hybrid bridge circuit 46 then determines one or more configuration parameters $CONF\_PARA_1$-$CONF\_PARA_K$ based on the received configuration command CONF_CMD. The hybrid bridge circuit 46 then writes the determined configuration parameters $CONF\_PARA_1$-$CONF\_PARA_K$ into the selected multi-bus slave circuit 48(1) via the second type communication bus 44 to thereby complete the configuration change in the selected multi-bus slave circuit 48(1).

Figure 3:
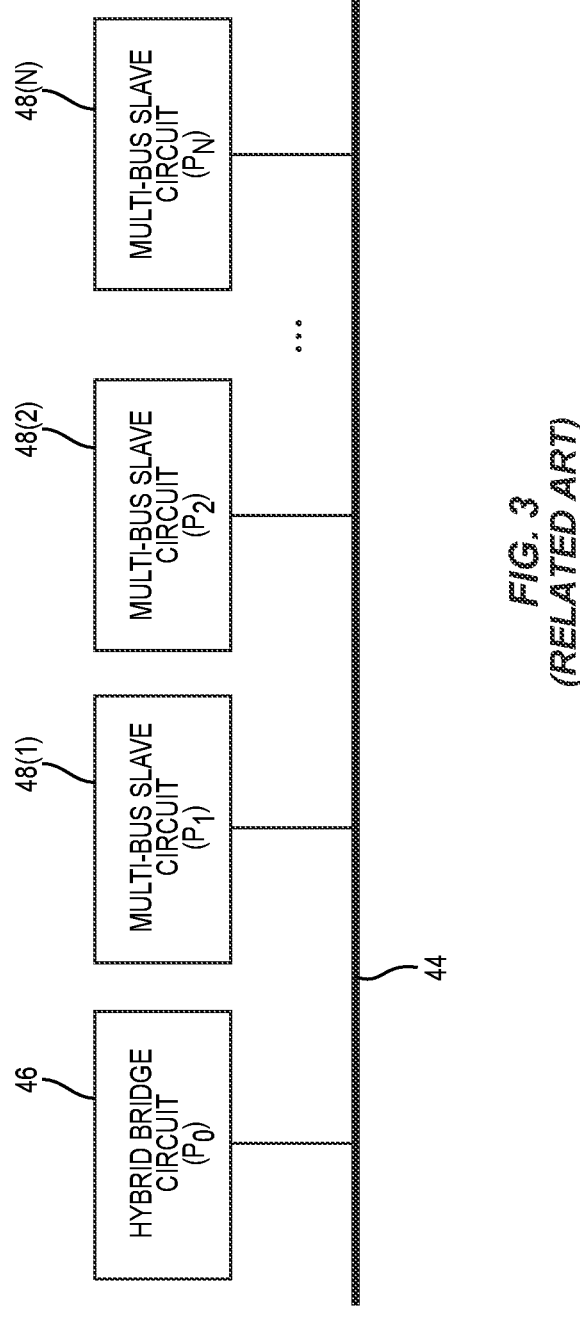
FIG. 3 is a schematic diagram of an exemplary single-wire peer-to-peer (P2P) bus that can be employed in the hybrid bus communication circuit of FIG. 2 to enable time constrained configuration changes.

As mentioned earlier, the second type communication bus 44 is a single-wire P2P bus whereby the hybrid bridge circuit 46 and the multi-bus slave circuits 48(1)-48(N) can initiate communication with one another based on a bus contention mechanism. In this regard, FIG. 3 is a schematic diagram providing an exemplary illustration as to how the second type communication bus 44 can be configured to enable peer-to-peer communication among the hybrid bridge circuit 46 and the multi-bus slave circuits 48(1)-48(N). Common elements between FIGS. 2 and 3 are shown therein with common element numbers and will not be re-described herein.

In an embodiment, the hybrid bridge circuit 46 and the multi-bus slave circuits 48(1)-48(N) are each assigned a respective one of a few bus access priorities $P_0$-$P_N$, with $P_0$ being the highest bus access priority and $P_N$ being the lowest bus access priority ($P_0 > P_1 > P_2 > P_3 > \ldots > P_N$). In this regard, the hybrid bridge circuit 46 is assigned the highest bus access priority $P_0$ and the multi-bus slave circuits 48(1)-48(N) are associated with descending bus access priorities $P_1$-$P_N$, respectively.

To content for the second type communication bus 44, any of the hybrid bridge circuit 46 and the multi-bus slave circuits 48(1)-48(N) may assert a bus contention indication when the second type communication bus 44 is in a defined bus state (e.g., the idle state) that permits bus contention. In this regard, the second type communication bus 44 is different from the existing single-bus communication circuit 10 in that any of the multi-bus slave circuits 48(1)-48(N) can initiate communication over the second type communication bus 44, without having to be Polled by the hybrid bridge circuit 46.

However, only one of the hybrid bridge circuit 46 and the multi-bus slave circuits 48(1)-48(N) with a highest bus access priority can gain access to the second type communication bus 44 at a time. As such, since the hybrid bridge circuit 46 has been assigned with the highest access priority $P_0$, the hybrid bridge circuit 46 will always be able to access the second type communication bus 44 over any of the multi-bus slave circuits 48(1)-48(N), thus allowing the hybrid bridge circuit 46 to initiate the time constrained configuration changes with minimum access delay. For further detail on how a peer circuit contends for and communicates over a single-wire P2P bus, please refer to U.S. patent application Ser. No. 16/675,335, entitled "SINGLE-WIRE PEER-TO-PEER BUS."

With reference back to FIG. 2, the hybrid bridge circuit 46 may be configured to initiate the time constrained configuration changes in response to receiving the configuration command CONF_CMD from the master circuit 50. Since the hybrid bridge circuit 46 can determine more configuration parameters $CONF\_PARA_1$-$CONF\_PARA_K$ independent of the master circuit 50, it is thus possible to reduce implementation complexity at the master circuit 50.

Nevertheless, the master circuit 50 may need to provide the configuration command CONF_CMD in sufficient advance to ensure that the hybrid bridge circuit 46 can determine and write the configuration parameters $CONF\_PARA_1$-$CONF\_PARA_K$ into the selected multi-bus slave circuit 48(1) on time. For example, if the master circuit 50 has so determined to provide an action to the selected multi-bus slave circuit 48(1) to perform a defined action based on the configuration parameters $CONF\_PARA_1$-$CONF\_PARA_K$, the master circuit 50 should provide the action command after a predetermined delay from providing the configuration command CONF_CMD to the hybrid bridge circuit 46. The predetermined delay should be sufficient to allow the hybrid bridge circuit 46 to complete the time constrained configuration changes in the selected multi-bus slave circuit 48(1) based on the configuration command CONF_CMD.

Concurrent to the hybrid bridge circuit 46 performing the time constrained configuration changes in the selected multi-bus slave circuit 48(1) over the second type communication bus 44, the master circuit 50 may communicate timing critical information with any of the multi-bus slave circuits 48(1)-48(N) over the first type communication bus 42, including the selected multi-bus slave circuit 48(1). In this regard, it is necessary to ensure that the time constrained configuration changes performed by the hybrid bridge circuit 46 do not interfere with the timing critical information communicated by the master circuit 50 in any of the multi-bus slave circuits 48(1)-48(N).

Figure 4:
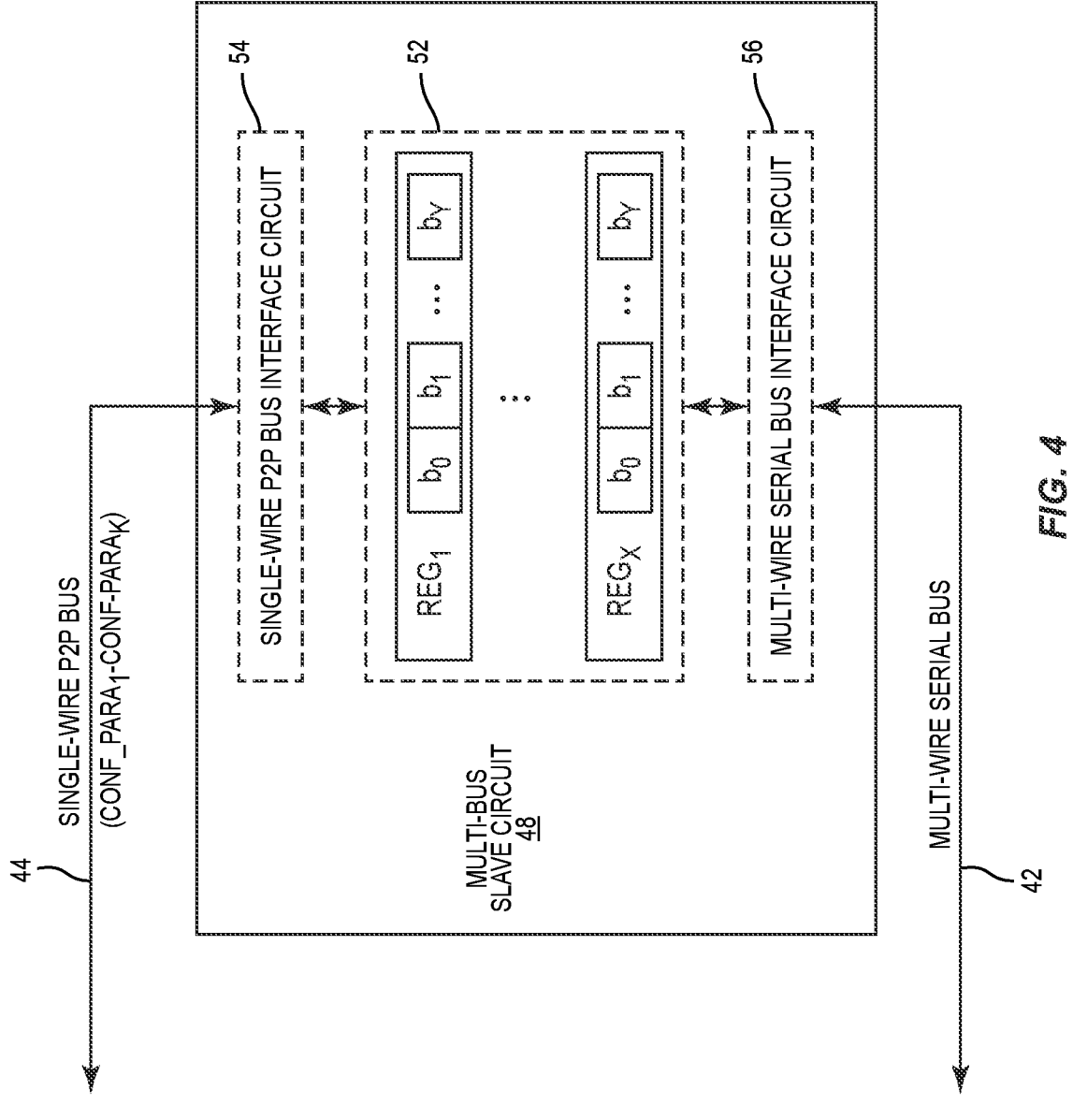
FIG. 4 is a schematic diagram providing an exemplary illustration of a multi-bus slave circuit in the hybrid bus communication circuit of FIG. 2 to enable time constrained configuration changes.

FIG. 4 is a schematic circuit of an exemplary multi-bus slave circuit 48, which can be any of the multi-bus slave circuits 48(1)-48(N) in the hybrid bus communication circuit 40 of FIG. 2. Common elements between FIGS. 2 and 4 are shown therein with common element numbers and will not be re-described herein.

The multi-bus slave circuit 48 includes a register circuit 52 that includes multiple registers $REG_1$-$REG_X$, each having multiple bits $b_0$-$b_Y$. The hybrid bridge circuit 46 can write the configuration parameters $CONF\_PARA_1$-

$CONF\_PARA_K$ into one or more of the bits $b_0$-$b_Y$ in one or more of the registers $REG_1$-$REG_X$ via a single-wire P2P bus interface circuit 54. The master circuit 50, on the other hand, can also write the timing critical information (also referred to as "second configuration parameters") directly into one or more of the bits $b_0$-$b_Y$ in one or more of the registers $REG_1$-$REG_X$ via a multi-wire serial bus interface circuit 56.

To prevent the hybrid bridge circuit 46 and the master circuit 50 from concurrently writing into a same bit in a same register, the register circuit 52 may be partitioned between the hybrid bridge circuit 46 and the master circuit 50. In one example, the partition may be performed at bit level such that the hybrid bridge circuit 46 and the master circuit 50 can only write into different bits in a same register. In another example, the partition may be performed at register level such that the hybrid bridge circuit 46 and the master circuit 50 can only write into different registers in the register circuit 52. Understandably, it is also possible to partition the register circuit 52 at both the bit level and the register level. By pre-partitioning the register circuit 52 between the hybrid bridge circuit 46 and the master circuit 50, the hybrid bridge circuit 46 and the master circuit 50 can independently write into the register circuit 52 without causing conflict and/or requiring any kind of arbitration, thus helping to reduce implementation complexity in the multi-bus slave circuit 48.

With reference back to FIG. 2, the hybrid bridge circuit 46 may be coupled to a number of single-bus slave circuits 58(1)-58(M) via a third type communication bus 60 different from the first type communication bus 42 and the second type communication bus 44. In a non-limiting example, the third type communication bus 60 can be identical to the SuBUS 16 and the single-bus slave circuits 58(1)-58(M) can be identical to the slave circuits 14(1)-14(M) in FIG. 1A. In this regard, the hybrid bridge circuit 46 can communicate non-timing critical information to the single-bus slave circuits 58(1)-58(M) based on the SuBUS telegrams 20, 22 in FIG. 1B. Accordingly, the single-bus slave circuits 58(1)-58(M) may each draw power from the master circuit 50 during the fast-charge period 28.

The hybrid bridge circuit 46 is configured to bridge communications between the master circuit 50 and the single-bus slave circuits 58(1)-58(M) in addition to enabling the time constrained configuration changes in the multi-bus slave circuits 48(1)-48(N). In this regard, the hybrid bridge circuit 46 plays a multi-functional role in the hybrid bus communication circuit 40.

Figure 5:
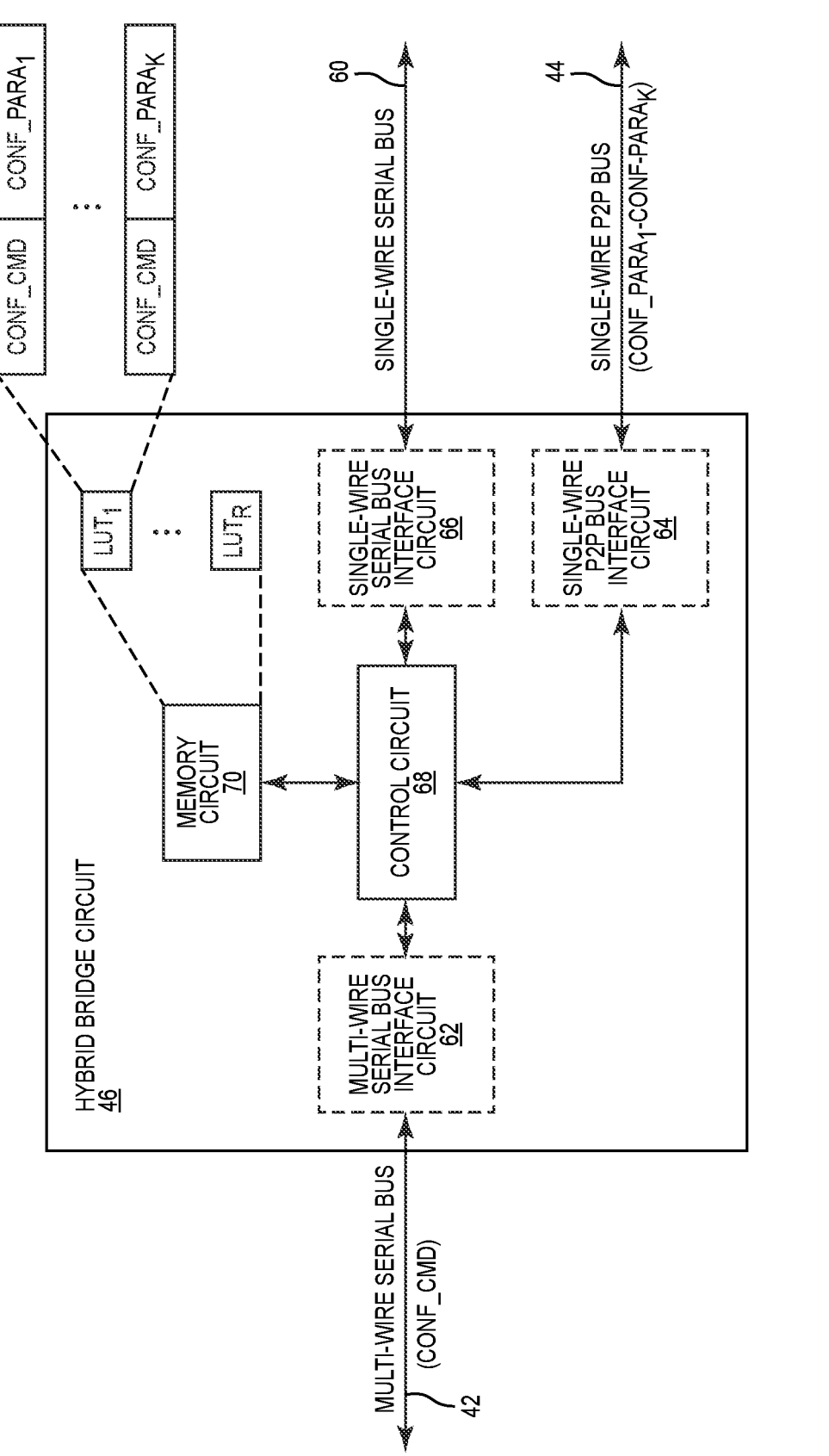
FIG. 5 is a schematic diagram providing an exemplary illustration of a hybrid bridge circuit in the hybrid bus communication circuit of FIG. 2 to enable time constrained configuration changes.

FIG. 5 is a schematic diagram providing an exemplary illustration of the hybrid bridge circuit 46 in the hybrid bus communication circuit 40 of FIG. 2. Common elements between FIGS. 2 and 5 are shown therein with common element numbers and will not be re-described herein.

In an embodiment, the hybrid bridge circuit 46 includes a multi-wire serial bus interface circuit 62, a single-wire P2P bus interface circuit 64, and a single-wire serial bus interface circuit 66 that are coupled to the first type communication bus 42, the second type communication bus 44, and the third type communication bus 60, respectively.

The hybrid bridge circuit 46 also includes a control circuit 68, which can be a field-programmable gate array (FPGA) or an application-specific integrated circuit (ASIC), as an example. The control circuit 68 can be configured to receive the configuration command CONF_CMD via the multi-wire serial bus interface circuit 62 and provide the configuration parameters $CONF\_PARA_1$-$CONF\_PARA_K$ to any of the multi-bus slave circuits 48(1)-48(N) via the single-wire $P_2P$ bus interface circuit 64. The control circuit 68 may also receive non-timing critical information via the multi-wire serial bus interface circuit 62 and provide the non-timing critical information to any of the single-bus slave circuits 58(1)-58(M) via the single-wire serial bus interface circuit 66.

The control circuit 68 may be configured to determine the configuration parameters $CONF\_PARA_1$-$CONF\_PARA_K$ based on a set of lookup tables (LUTs) $LUT_1$-$LUT_R$. In a non-limiting example, the LUTs $LUT_1$-$LUT_R$ can be pre-configured (e.g., at factory) or dynamically configured via over-the-air (OTA) into a memory circuit 70 (e.g., a flash memory circuit). Each of the LUTs $LUT_1$-$LUT_R$ is configured to correlate a respective configuration command CONF_CMD to respective set of configuration parameters $CONF\_PARA_1$-$CONF\_PARA_K$. Accordingly, the control circuit 68 may select an appropriate one of the LUTs $LUT_1$-$LUT_R$ based on the received configuration command CONF_CMD and retrieve the corresponding configuration parameters $CONF\_PARA_1$-$CONF\_PARA_K$ in the selected LUT.

Those skilled in the art will recognize improvements and modifications to the embodiments of the present disclosure. All such improvements and modifications are considered within the scope of the concepts disclosed herein and the claims that follow.

What is claimed is:

1. A hybrid bus communication circuit comprising:
   a first type communication bus comprising multiple wires and configured to carry timing critical information;
   a second type communication bus and a third type communication bus each consisting of a single wire and having a slower data rate than the first type communication bus, wherein the second type communication bus is configured to carry timing constrained information less time-sensitive than the timing critical information and the third type communication bus is configured to carry non-timing critical information less time-sensitive than the timing constrained information;
   a master circuit coupled exclusively to the first type communication bus;
   a hybrid bridge circuit coupled to the first type communication bus, the second type communication bus, and the third type communication bus; and
   a plurality of multi-bus slave circuits each coupled to the master circuit via the first type communication bus and coupled to the hybrid bridge circuit via the second type communication bus;
   a plurality of single-bus slave circuits coupled to the hybrid bridge circuit via the third type communication bus; and
   wherein the hybrid bridge circuit and each of the plurality of multi-bus slave circuits can initiate communication over the second type communication bus via a bus contention mechanism and the hybrid bridge circuit is configured to:
      receive a configuration command from the master circuit via the first type communication bus;
      determine one or more configuration parameters based on the received configuration command; and
      configure the determined one or more configuration parameters in at least one selected multi-bus slave circuit among the plurality of multi-bus slave circuits via the second type communication bus.

2. The hybrid bus communication circuit of claim 1, wherein the master circuit is configured to:
   provide the configuration command to the hybrid bridge circuit via the first type communication bus to thereby cause the hybrid bridge circuit to configure the determined one or more configuration parameters in the at least one selected multi-bus slave circuit; and provide an action command to the at least one selected multi-bus slave circuit via the second type communication bus to thereby cause the at least one selected multi-bus slave circuit to perform a defined action based on the one or more configuration parameters.

3. The hybrid bus communication circuit of claim 2, wherein the master circuit further provides the action command to the at least one selected multi-bus slave circuit after a predetermined delay from providing the configuration command to the hybrid bridge circuit such that the hybrid bridge circuit can configure the one or more configuration parameters in the at least one selected multi-bus slave circuit prior to the at least one selected multi-bus slave circuit receiving the action command.

4. The hybrid bus communication circuit of claim 1, wherein the plurality of multi-bus slave circuits each comprises a plurality of registers each comprising a plurality of bits.

5. The hybrid bus communication circuit of claim 4, wherein the hybrid bridge circuit is further configured to write the one or more configuration parameters into one or more of the plurality of bits in one or more of the plurality of registers comprised in the at least one selected multi-bus slave circuit.

6. The hybrid bus communication circuit of claim 5, wherein the master circuit is further configured to write one or more second configuration parameters directly into one or more the plurality of bits in one or more of the plurality of registers in any of the plurality of multi-bus slave circuits.

7. The hybrid bus communication circuit of claim 6, wherein the master circuit and the hybrid bridge circuit are configured not to write concurrently into an identical one of the plurality of bits in an identical one of the plurality of registers comprised in an identical one of the plurality of multi-bus slave circuits.

8. The hybrid bus communication circuit of claim 1, wherein the hybrid bridge circuit comprises a control circuit configured to:

receive the configuration command via the first type communication bus;

determine the one or more configuration parameters based on the received configuration command; and configure the determined one or more configuration parameters in the at least one selected multi-bus slave circuit among the plurality of multi-bus slave circuits via the second type communication bus.

9. The hybrid bus communication circuit of claim 8, wherein the hybrid bridge circuit further comprises a memory circuit configured to store one or more lookup tables (LUTs) each predetermined to correlate a respective configuration command with one or more respective configuration parameters.

10. The hybrid bus communication circuit of claim 9, wherein the control circuit is further configured to:

determine a selected one of the one or more LUTs having the respective configuration command matching the received configuration command; and determine the one or more configuration parameters as being the one or more respective configuration parameters corresponding to the selected one of the one or more LUTs.

11. The hybrid bus communication circuit of claim 1, wherein:

the first type communication bus is a multi-wire serial bus comprising a radio frequency front-end (RFFE) bus;

the second type communication bus is a single-wire peer-to-peer bus; and the third type communication bus is a single-wire serial bus (SuBUS).

12. The hybrid bus communication circuit of claim 1, wherein the hybrid bridge circuit comprises:

a multi-wire serial bus interface circuit coupled to the first type communication bus;

a single-wire peer-to-peer bus interface circuit coupled to the second type communication bus; and a single-wire serial bus interface circuit coupled to the third type communication bus.

13. The hybrid bus communication circuit of claim 1, wherein each of the hybrid bridge circuit and the plurality of multi-bus slave circuits is configured to communicate exclusively with the master circuit via the first type communication bus.

14. The hybrid bus communication circuit of claim 1, wherein each of the hybrid bridge circuit and the plurality of multi-bus slave circuits is configured to communicate directly with one another via the second type communication bus, independent of the master circuit.

15. The hybrid bus communication circuit of claim 14, wherein each of the hybrid bridge circuit and the plurality of multi-bus slave circuits is preassigned a respective access priority for accessing the second type communication bus.

16. The hybrid bus communication circuit of claim 15, wherein the hybrid bridge circuit is preassigned with a highest access priority.

17. The hybrid bus communication circuit of claim 1, wherein:

each of the plurality of single-bus slave circuits is configured to communicate exclusively with the hybrid bridge circuit via the third type communication bus; and the hybrid bridge circuit is further configured to bridge communications between the master circuit and the plurality of single-bus slave circuits.

18. The hybrid bus communication circuit of claim 17, wherein the plurality of single-bus slave circuits is each configured to draw power from the master circuit via the third type communication bus.

19. A wireless device comprising a hybrid bus communication circuit, the hybrid bus communication circuit comprises:

a first type communication bus comprising multiple wires and configured to carry timing critical information;

a second type communication bus and a third type communication bus each consisting of a single wire and having a slower data rate than the first type communication bus, wherein the second type communication bus is configured to carry timing constrained information less time-sensitive than the timing critical information and the third type communication bus is configured to carry non-timing critical information less time-sensitive than the timing constrained information;

a master circuit coupled exclusively to the first type communication bus;

a hybrid bridge circuit coupled to the first type communication bus, the second type communication bus, and the third type communication bus;

a plurality of multi-bus slave circuits each coupled to the master circuit via the first type communication bus and coupled to the hybrid bridge circuit via the second type communication bus;

a plurality of single-bus slave circuits coupled to the hybrid bridge circuit via the third type communication bus; and wherein the hybrid bridge circuit and each of the plurality of multi-bus slave circuits can initiate communication 5 over the second type communication bus via a bus contention mechanism and the hybrid bridge circuit is configured to:

receive a configuration command from the master circuit via the first type communication bus;  10 determine one or more configuration parameters based on the received configuration command; and configure the determined one or more configuration parameters in at least one selected multi-bus slave circuit among the plurality of multi-bus slave circuits 15 via the second type communication bus.

* * * * *